UNITED STATES PATENT OFFICE.

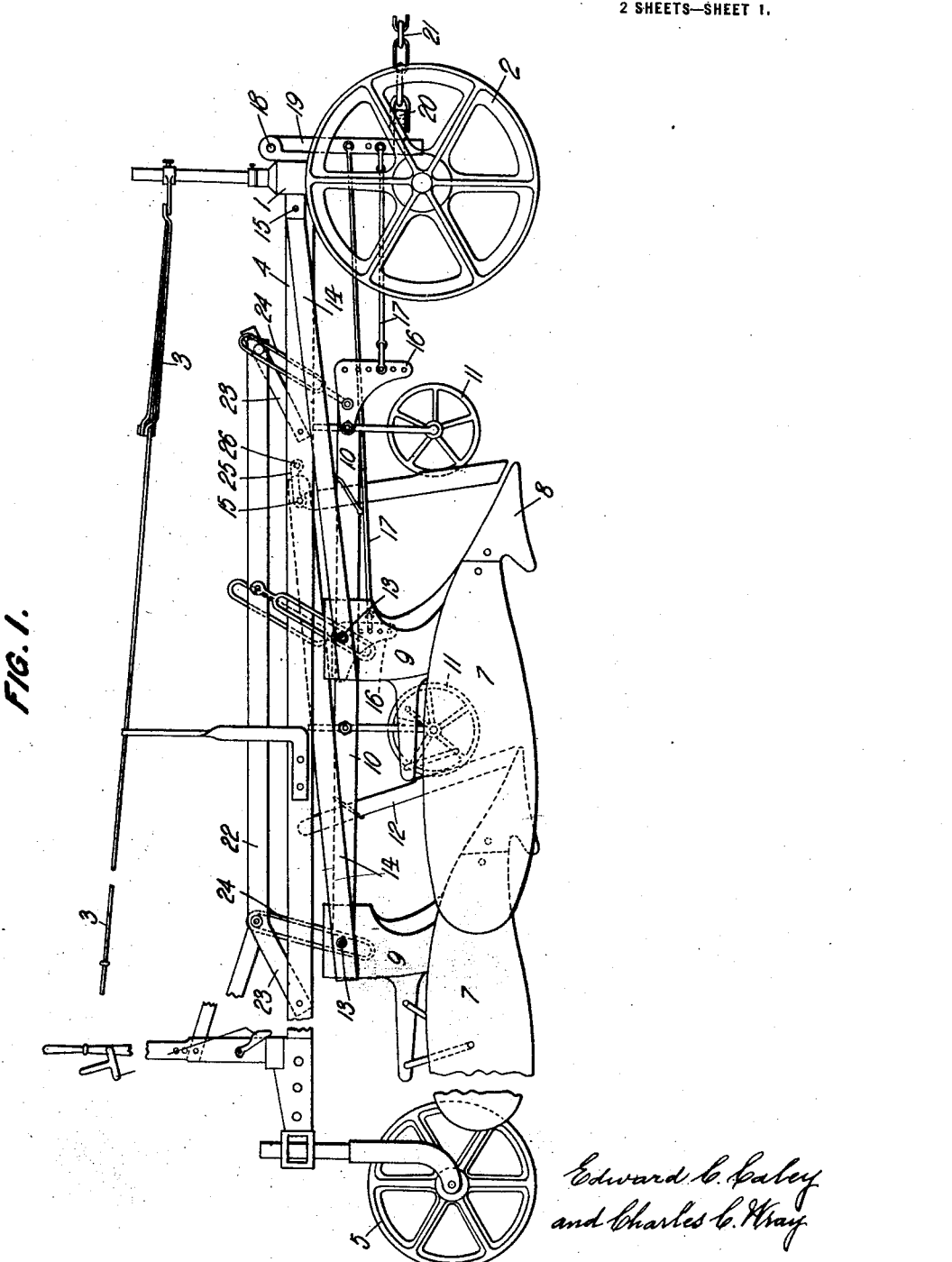

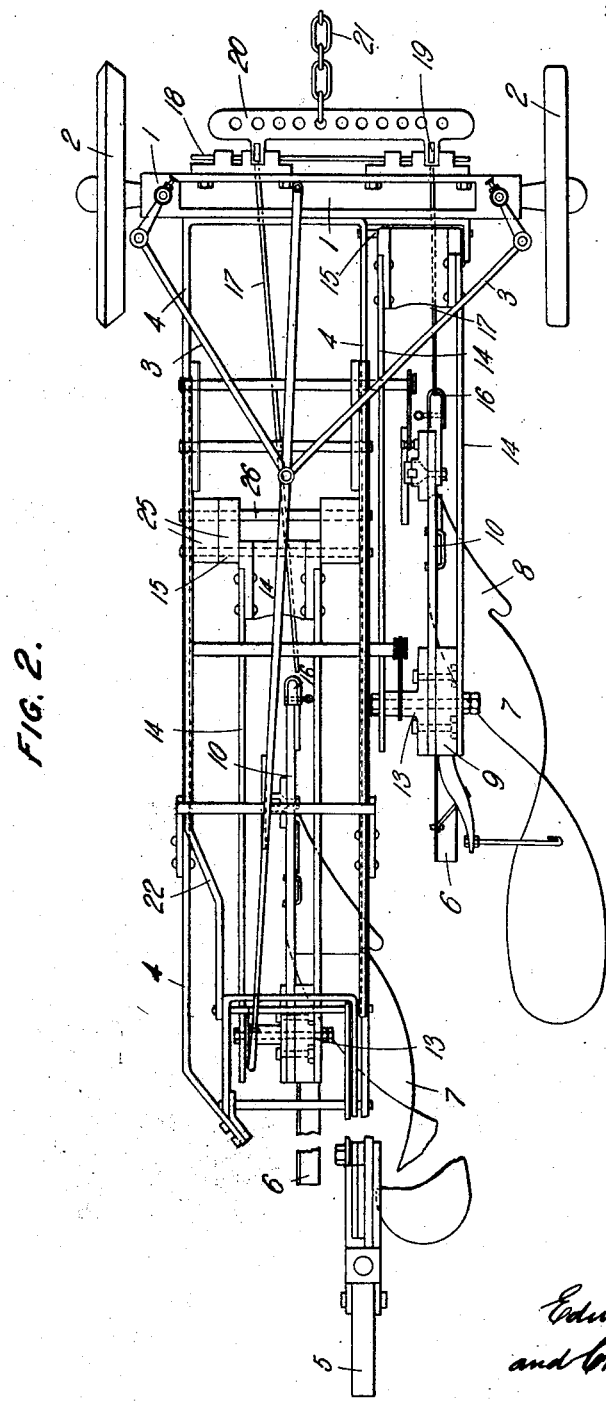

EDWARD CORNELL CALEY AND CHARLES CREASEY WRAY, OF BURTON PIDSEA, NEAR KINGSTON-UPON-HULL, ENGLAND.

AGRICULTURAL PLOW.

1,347,321.  Specification of Letters Patent.  Patented July 20, 1920.

Application filed March 4, 1920.  Serial No. 363,162.

*To all whom it may concern:*

Be it known that we, EDWARD CORNELL CALEY and CHARLES CREASEY WRAY, subjects of the King of Great Britain, residing at Burton Pidsea, near Kingston-upon-Hull, in the county of York, England, have invented certain new and useful Improvements in or Relating to Agricultural Plows, of which the following is a specification.

This invention relates to agricultural plows of the kind comprising a wheeled frame or carriage to which one or more plow units are pivoted about horizontal axes, its object being to provide an improved construction in which the plow unit or units are capable of such a movement that they will automatically adjust themselves to conform to uneven ground, so that a furrow or furrows of an even depth will be produced when for example, plowing across ridged land either transversely or diagonally. Further advantages obtained by the use of the invention are that the plow units will automatically keep a true course without the person in charge having to guide the plow by means of handles as heretofore so leaving such person at liberty to control the horses only, if the plow is drawn by horses, or if the plow is drawn by a motor tractor or the like, dispensing with the necessity for the employment of a person to guide the plow, thereby allowing of plowing of land being effected with the greatest ease and with the minimum amount of labor.

Various methods of pivoting a plow unit about horizontal axes to a wheeled frame or carriage have been proposed. For example, it is known to pivot the beam to the frame with its clevis also linked to the frame and to pivot the body to the beam in combination with a spring connection between these parts. According to the present invention, however, the plow unit, or each of the plow units, which is built up of the usual body (with its land-side, mold-board and share) beam and gage wheel with a colter when desired, is pivoted about a horizontal axis at or at about the junction of beam and body to a lever or frame which is itself pivoted about a horizontal axis to the wheeled frame or carriage, and such plow unit or units is or are also connected to the tractor means by a link or the like from a clevis at the end of the beam. The plow unit, or each plow unit is thus pivoted to the lever or frame behind its gage wheel and preferably the lever or frame is pivoted to the wheeled frame or carriage in front of the gage wheel, although in some cases the lever or frame may extend rearwardly from the plow unit and be pivoted to the wheeled frame or carriage behind this gage wheel.

The link connecting the clevis of the plow unit, or that of each plow unit, to the tractor means is attached to one main clevis in the form of a bar or frame which is hinged to the wheeled frame or carriage, the drag chain or other tractor coupling being connected to such main clevis. Preferably means are provided whereby the connection from the plow unit clevis or from each plow unit clevis and from the tractor means may be attached to the main clevis at different distances from the hinge.

In the accompanying drawings:—Figure 1 is an elevation of an agricultural plow according to the present invention provided with two plow units; Fig. 2 is a plan of Fig. 1.

Like reference numerals indicate like parts throughout the drawings.

In carrying out the present invention a wheeled frame or carriage is provided which in the construction illustrated, comprises a front bracket 1 carrying the axles for the steering wheels 2 (with steering gear 3) and a frame 4 having a trailing wheel 5. One of the steering wheels 2 is arranged to run in an open furrow and the steering gear may be locked in any suitable manner.

Each plow unit is built up of the usual body (with its land side 6, mold-board 7, share 8 and standard 9) beam 10 and gage wheel 11 with a colter 12 when desired. Each plow unit is pivoted at 13 at or at about the junction of the beam 10 with the standard 9 to a frame or lever 14 which is itself pivoted at 15 to the wheeled frame 4.

The clevis 16 of each plow unit is connected by a link 17 to one main clevis which is hinged to the front axle bracket 1 at 18.

In the construction illustrated the main clevis comprises arms 19 hinged to the front axle bracket and connected to the main clevis 20, each link 17 is connected to one of the arms 19 and the distance from the hinge 18 at which this connection is made may be varied by providing the arms 19 with a series of holes similar to the series with which it is usual to provide the clevis 16.

Similarly, the distance of the main clevis 20 from the hinge 18 may be varied.

The main clevis 20 is also provided with a series of holes in any one of which the drag chain 21 or other tractor coupling is connected. If desired, the hinge 18 may be so constructed that the whole hinged frame 19—20 may be adjusted laterally on the front axle bracket 1.

Each plow unit is provided with the usual or any desired adjustment means for regulating the depth of furrow produced.

All the plow units may be lifted into an inoperative position by any desired means such as, for example, the frame 22 linked to the wheeled frame 4 at 23 and to each plow unit by the slotted links 24.

It will be appreciated that with a plow according to the present invention each plow unit will be provided with two distinct pivotal movements about the pivots 13 and 15, so that when the steering wheels 2 encounter a rise or depression in the ground each plow unit will remain at its former relative position with the ground until its own gage wheel 11 encounters the rise or depression when the plow unit will conform thereto to continue to produce a furrow of even depth. Thus ridged land may be plowed transversely or diagonally with furrows of even depth throughout by a plow according to the present invention.

Although only two plow units are illustrated in the accompanying drawings, it will be understood that a greater number may be provided on the one carriage or wheeled frame by suitably modifying the shape and size of the latter, each plow unit being pivoted at 13 to its frame or lever 14 which is itself pivoted to the wheeled frame or carriage.

In the construction illustrated each plow unit is pivoted to its lever or frame 14 behind its gage wheel while the lever or frame is pivoted to the wheeled frame or carriage in front of that gage wheel. If desired, however, the lever or frame 14 may extend rearwardly from the plow unit and be pivoted to the wheeled frame or carriage 4 behind the gage wheel.

Means may be provided for adjusting the lateral distance between the plow units, as for example, by providing distance blocks 25 pivoted to the frame 4 at 26 and extending over the spindle forming the pivot 15. By lifting one of the blocks 25 above its pivot 26 the plow unit may be moved along its pivot 15 and the block 25 may be moved along the spindle 26 to the other side of the plow unit thus locking it in the new position.

Having thus fully described our invention, what we claim as new and desire to secure by Letters Patent is:—

1. The combination, with a wheeled frame, of plows provided with substantially horizontal plow beams, gage wheels supported from the plow beams in front of the plows, downwardly and rearwardly inclined bars having their front ends pivoted to the front end portion of the frame by horizontal pivots and having their rear end portions pivotally connected with the rear end parts of the plow beams, a clevis pivoted on a horizontal axis at the front end portion of the said frame and provided with a draft connection, and links extending longitudinally under the front end pivots of the said bars and connecting the front end portions of the plow beams with the said clevis.

2. The combination, with a wheeled frame, of plows provided with substantially horizontal plow beams, gage wheels supported from the plow beams in front of the plows, downwardly and rearwardly inclined bars having their front ends pivoted to the front end portion of the frame by horizontal pivots and having their rear end portions pivotally connected with the rear end parts of the plow beams, a clevis pivoted on a horizontal axis at the front end portion of the said frame and provided with a draft connection, and adjustable links extending longitudinally under the front end pivots of the said bars and connecting the front end portions of the plow beams with the said clevis, the said plow beams and clevis being provided with means for connecting the said adjustable links to them at different distances from the pivot of the said clevis.

In testimony whereof we affix our signatures in the presence of two witnesses.

EDWARD CORNELL CALEY.
CHARLES CREASEY WRAY.

Witnesses:
 LOUIS E. KIPPAX,
 FRED. H. RHODES.